US012747983B2

(12) United States Patent
Isshiki et al.

(10) Patent No.: US 12,747,983 B2

(45) Date of Patent: Sep. 29, 2026

(54) OPTICAL CONCENTRATION MEASURING DEVICE AND SIGNAL PROCESSOR

(71) Applicant: Asahi Kasei Microdevices Corporation, Tokyo (JP)

(72) Inventors: Shota Isshiki, Tokyo (JP); Hiroki Nikaido, Tokyo (JP)

(73) Assignee: Asahi Kasei Microdevices Corporation, Tokyo (JP)

( * ) Notice: Subject to any disclaimer, the term of this patent is extended or adjusted under 35 U.S.C. 154(b) by 50 days.

(21) Appl. No.: 19/064,719

(22) Filed: Feb. 27, 2025

(65) Prior Publication Data

US 2025/0283756 A1 Sep. 11, 2025

(30) Foreign Application Priority Data

Mar. 6, 2024 (JP) ................................ 2024-034107
Jan. 10, 2025 (JP) ................................ 2025-004275

(51) Int. Cl.

*G01J 1/44* (2006.01)
*G01J 1/16* (2006.01)
*G01N 21/01* (2006.01)
*G01N 21/17* (2006.01)

(52) U.S. Cl.

CPC ............... *G01J 1/44* (2013.01); *G01J 1/1626* (2013.01); *G01N 21/01* (2013.01); *G01N 21/1702* (2013.01); *G01J 2001/1636* (2013.01); *G01J 2001/444* (2013.01); *G01N 2021/0106* (2013.01); *G01N 2021/1704* (2013.01)

(58) Field of Classification Search

CPC .... G01J 1/44; G01J 1/1626; G01J 2001/1636; G01J 2001/444; G01N 21/01; G01N 21/1702; G01N 2021/0106; G01N 2021/1704

See application file for complete search history.

(56) References Cited

U.S. PATENT DOCUMENTS

| | | | | |
|---|---|---|---|---|
| 2010/0110096 | A1 | 5/2010 | Satoh et al. | |
| 2016/0334272 | A1 | 11/2016 | Saito et al. | |
| 2018/0259444 | A1 * | 9/2018 | Buijs .................. | B01D 19/0031 |
| 2022/0132051 | A1 | 4/2022 | Park et al. | |

FOREIGN PATENT DOCUMENTS

| | | | |
|---|---|---|---|
| JP | H04219998 | A | 8/1992 |
| JP | 2013120156 | A | 6/2013 |
| JP | 2018146435 | A | 9/2018 |
| WO | 2008143211 | A1 | 11/2008 |
| WO | 2015105048 | A1 | 7/2015 |

* cited by examiner

*Primary Examiner* — Georgia Y Epps
*Assistant Examiner* — Don J Williams
(74) *Attorney, Agent, or Firm* — KENJA IP LAW PC

(57) ABSTRACT

An optical concentration measuring device includes a light source, detectors (21, 22) that detect a signal, based on light emitted from the light source, and output a detection signal, a signal processor (50) that acquires the detection signal and converts the detection signal to a digital signal, and a substrate (30) on which the detector and the signal processor are provided. The signal processor has a terminal array in which a plurality of signal terminals is sandwiched between a plurality of voltage terminals, the signal terminals being input and output terminals of signal lines electrically connected to the detectors, 10 the voltage terminals supplying a voltage other than 0 V. In plan view of the substrate from the front, the signal processor and wiring connecting the plurality of voltage terminals surround the signal lines.

8 Claims, 2 Drawing Sheets

OPTICAL CONCENTRATION MEASURING DEVICE AND SIGNAL PROCESSOR

CROSS-REFERENCE TO RELATED APPLICATION

The present application claims priority to Japanese Patent Application No. 2024-034107 filed on Mar. 6, 2024, and Japanese Patent Application No. 2025-004275 filed on Jan. 10, 2025, the entire contents of which are incorporated herein by reference.

TECHNICAL FIELD

The present disclosure relates to an optical concentration measuring device and a signal processor.

BACKGROUND

In recent years, gas sensors (gas measurement devices) that include a light source emitting infrared light and are configured so that the infrared light passes through a gas containing a gas to be detected have been developed. These gas sensors detect the concentration of the gas to be detected by using the absorption characteristics of the infrared light by the gas to be detected. For example, infrared sensor modules that include an infrared sensor, an integrated circuit (IC) that processes the output signal of the infrared sensor, and a package housing the infrared sensor and IC have been proposed. In small infrared sensor modules, the IC may perform signal processing based on minute currents of the order of nA, for example, making it necessary to suppress leakage currents and the like to improve detection accuracy. For example, Patent Literature (PTL) 1 discloses an output current detection IC, for a diode-type sensor, in which the effect of leakage current is reduced.

CITATION LIST

Patent Literature

PTL 1: WO2015/105048A1

SUMMARY

Here, the technology in PTL 1 reduces the leakage current of a protection circuit, and it is difficult to apply this technology directly to normal measurement by gas sensors. In addition, a conventional method is known for suppressing leakage current by using a layout that surrounds the infrared sensor with a ground potential on the gas sensor substrate. The conventional method has limited effectiveness in suppressing leakage current, however, and demand exists for a more effective method.

It would be helpful to provide an optical concentration measuring device and a signal processor with an enhanced leakage current suppression effect.

(1) An optical concentration measuring device according to an embodiment of the present disclosure includes:

a light source configured to emit light toward a gas detection space into which a gas to be detected is introduced;

a detector configured to detect a signal, based on at least a portion of the light that was emitted from the light source and passed through the gas to be detected, and output a detection signal;

a signal processor configured to acquire the detection signal and convert the detection signal to a digital signal; and a substrate on which the detector and the signal processor are provided, wherein the detector includes a first detector and a second detector, the signal processor is configured to form a terminal array in which a plurality of signal terminals is sandwiched between a plurality of voltage terminals, the signal terminals being input and output terminals of signal lines electrically connected to the detector, the voltage terminals supplying a constant voltage other than 0 V and not being electrically connected to the detector, the plurality of voltage terminals includes a first voltage terminal, a second voltage terminal, and a third voltage terminal, and in plan view of the substrate from a front, the signal processor and a wiring connecting the first voltage terminal and the second voltage terminal surround signal lines connecting the first detector and the signal processor, and the signal processor and a wiring connecting the second voltage terminal and the third voltage terminal surround signal lines connecting the second detector and the signal processor.

(2) As an embodiment of the present disclosure, in (1), the plurality of signal terminals includes at least two signal terminals, for connection to the first detector, sandwiched between the first voltage terminal and the second voltage terminal, and at least two signal terminals, for connection to the second detector, sandwiched between the second voltage terminal and the third voltage terminal.

(3) As an embodiment of the present disclosure, in (2), the plurality of signal terminals includes two signal terminals, for connection to the first detector, sandwiched between the first voltage terminal and the second voltage terminal, and two signal terminals, for connection to the second detector, sandwiched between the second voltage terminal and the third voltage terminal.

(4) As an embodiment of the present disclosure, in any one of (1) to (3), in plan view of the substrate from the front, the signal processor is rectangular in shape, and the plurality of voltage terminals and the plurality of signal terminals are all provided on one side of the signal processor.

(5) As an embodiment of the present disclosure, in any one of (1) to (4), a portion of the wiring connecting the first voltage terminal and the second voltage terminal is common to a portion of the wiring connecting the second voltage terminal and the third voltage terminal.

(6) As an embodiment of the present disclosure, in any one of (1) to (5), a wiring length from the signal processor to the first detector is shorter than a wiring length from the signal processor to the second detector.

(7) As an embodiment of the present disclosure, in any one of (1) to (6), a portion of the wiring has a disconnected section, and a length of the disconnected section is 1/10 or less of a length of a signal line connecting to the detector from the signal terminal.

(8) A signal processor according to an embodiment of the present disclosure is useable in the optical concentration measuring device of any one of (1) to (7).

According to the present disclosure, an optical concentration measuring device and a signal processor with an enhanced leakage current suppression effect can be provided.

DETAILED DESCRIPTION

The gas sensor 10 (see FIG. 1) and the signal processor 50 (see FIG. 2) according to an embodiment of the present disclosure are described below with reference to the drawings.

(Gas Sensor 10)

Figure 1:
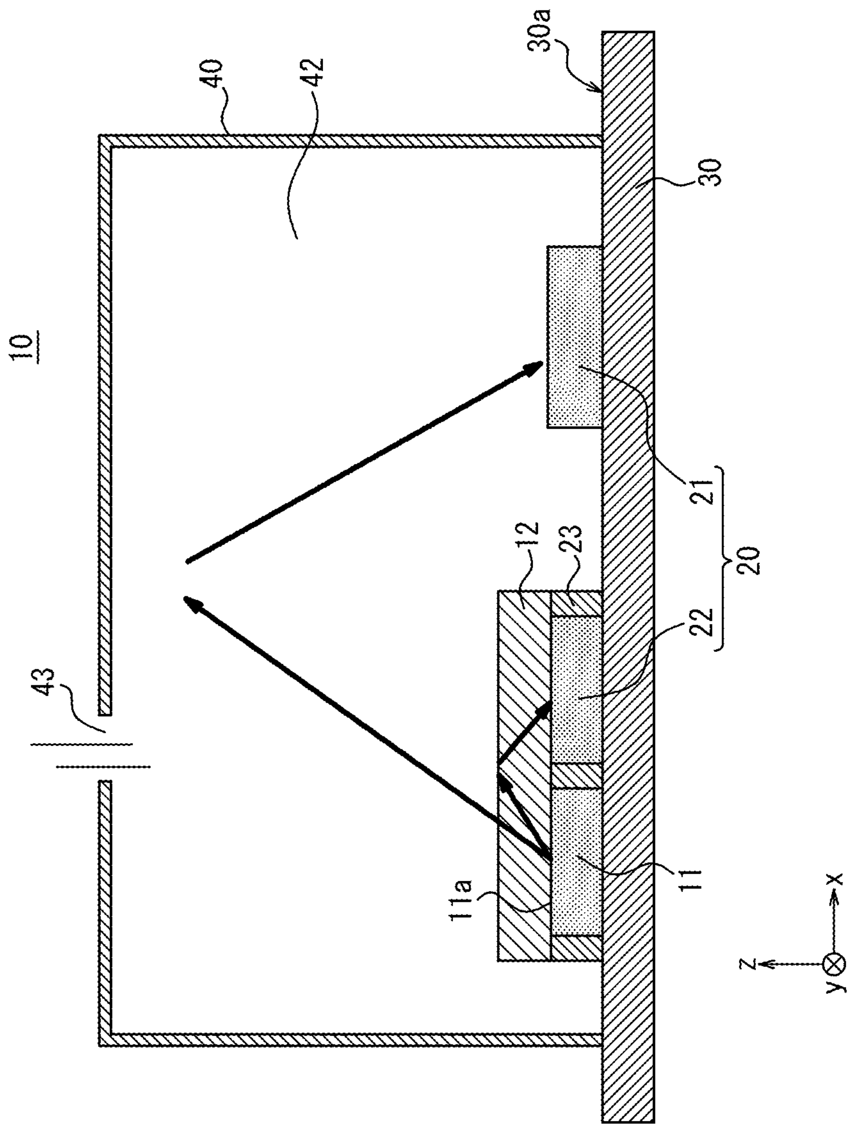
FIG. 1 is a diagram illustrating an example configuration of a gas sensor according to an embodiment of the present disclosure.

FIG. 1 is a diagram illustrating a configuration of the gas sensor 10 according to the present embodiment. The gas sensor 10 measures the presence or concentration of a gas to be detected included in a gas. In the present embodiment, the gas sensor 10 is described as a device that measures the concentration of the gas to be detected. The gas sensor 10 in the present embodiment is an NDIR (non-dispersive infrared) gas sensor, but the gas sensor 10 is not limited to this configuration and may, for example, be a photoacoustic gas sensor. The NDIR gas sensor 10 measures the concentration of the gas to be detected using an infrared light receiving element that receives infrared light in an absorption wavelength band corresponding to the gas to be detected and an infrared light emitting element that emits infrared light in that absorption wavelength band. In the case of the gas sensor 10 being a photoacoustic gas sensor, the concentration of the gas to be detected is measured by using a high-performance microphone to pick up, as sound (pressure change), the vibration of the gas molecules that absorbed the light. The gas sensor 10 in the present embodiment can be applied to a variety of devices. For example, the gas sensor 10 can be used for environmental measurement in buildings, mounted on portable communication devices such as smartphones as a portable compact measuring device, or used for gas detection in the interior of vehicles such as cars, trains, or airplanes.

According to the configuration of the gas sensor 10 in the present embodiment, the gas sensor 10 is applicable as a light receiving/emitting device for applications other than gas detection. That is, disclosure content derived by replacing “gas sensor 10” as described above with “optical concentration measuring device”, “optical physical quantity measuring device”, “light receiving/emitting device”, “optical device”, or the like is included in the scope of the present disclosure. For example, the state of an optical path space can be detected (examples other than gas include the presence or absence or concentration of a specific component of a fluid). For example, the disclosure content can be used for a component detection device or a component concentration measuring device for a substance (for example, water or a body fluid) present in an optical path space between a light emitter and a light receiver. For example, when the substance present in the optical path space is blood, the component detection device or the component concentration measuring device can be used to measure glucose concentration in blood.

The component detection device or the component concentration measuring device can measure glucose concentration in blood sugar by measuring absorption of light having a wavelength of 1 μm to 10 μm. In the measurement of glucose concentration in blood sugar, measuring absorption of light in the 1.6 μm band, the 2.0 μm band, and the 10.0 μm band is preferred. A compact, high precision, and highly reliable non-invasive glucose concentration meter can be realized. Such a glucose concentration meter allows, for example, a diabetic patient to self-check blood sugar levels with good precision and without causing damage to the skin as would occur with an invasive method. Furthermore, more accurate administration of medication (for example, insulin) can be achieved, based on the blood sugar levels checked.

The gas sensor 10 includes a light source 11, a detector 20, a signal processor 50 (see FIG. 2), and a substrate 30. In the present embodiment, the detector 20 is configured by a first detector 21 and a second detector 22. The gas sensor 10 also includes a gas cell 40. Here, the detector 20 detects a signal based on light emitted from the light source 11 and outputs a detection signal. The signal detected by the detector 20 may be the light itself (the aforementioned NDIR method) or may include vibrations of gas molecules that have absorbed the light (the aforementioned photoacoustic method).

The gas cell 40 has a hole 43 through which a gas (for example, ambient air) passes, and gas is introduced through the hole 43 into a gas detection space 42. The gas sensor 10 measures the presence or concentration of a gas to be detected included in the introduced gas. The gas to be detected can be a combustible gas such as carbon dioxide, exhaled alcohol (ethanol or the like), methane, propane, hydrogen, ethylene, or methylcyclohexane (MCH). The gas to be detected may also be a toxic gas such as carbon monoxide, hydrogen sulfide, formaldehyde, or ammonia. Furthermore, the gas to be detected may be a greenhouse gas, such as dinitrogen monoxide or refrigerant gases used in air conditioners or refrigerators (freon, freon substitutes, R32, R1234y). The gas sensor 10 measures the concentration of the gas to be detected in the gas introduced into the gas detection space 42 and outputs the measurement results.

The gas sensor 10 is configured to include the gas cell 40 on a main surface 30*a* of the substrate 30. Here, the main surface 30*a* is one of the faces with the largest area among the faces of the substrate 30. As illustrated in FIG. 1, Cartesian coordinates are set so that the xy-plane is parallel to the main surface 30*a* of the substrate 30. The z-axis direction is a direction perpendicular to the main surface 30*a* of the substrate 30. The z-axis direction is also referred to as the up-down direction. In this case, the positive z-axis direction corresponds to the up direction. The plan view is the view looking in the negative z-axis direction (down direction). In the present embodiment, the light source 11, the detector 20, and the signal processor 50 are provided on the main surface 30*a* of the substrate 30 and are arranged inside the gas detection space 42 on the main surface 30*a*.

In the present embodiment, the second detector 22 is integrated with the light source 11. In greater detail, the light source 11 and the second detector 22 are sealed on one side of a light source substrate 12 by a seal 23. In other words, the light source substrate 12, the light source 11, the second detector 22, and the seal 23 are integrated to form a light source module. FIG. 1 illustrates a cross-section view of the gas sensor 10 including these components. Here, a detection substrate may be present for the first detector 21 on the light input side in correspondence with the light source substrate 12, but such a detection substrate is omitted from FIG. 1 for clarity.

Figure 2:
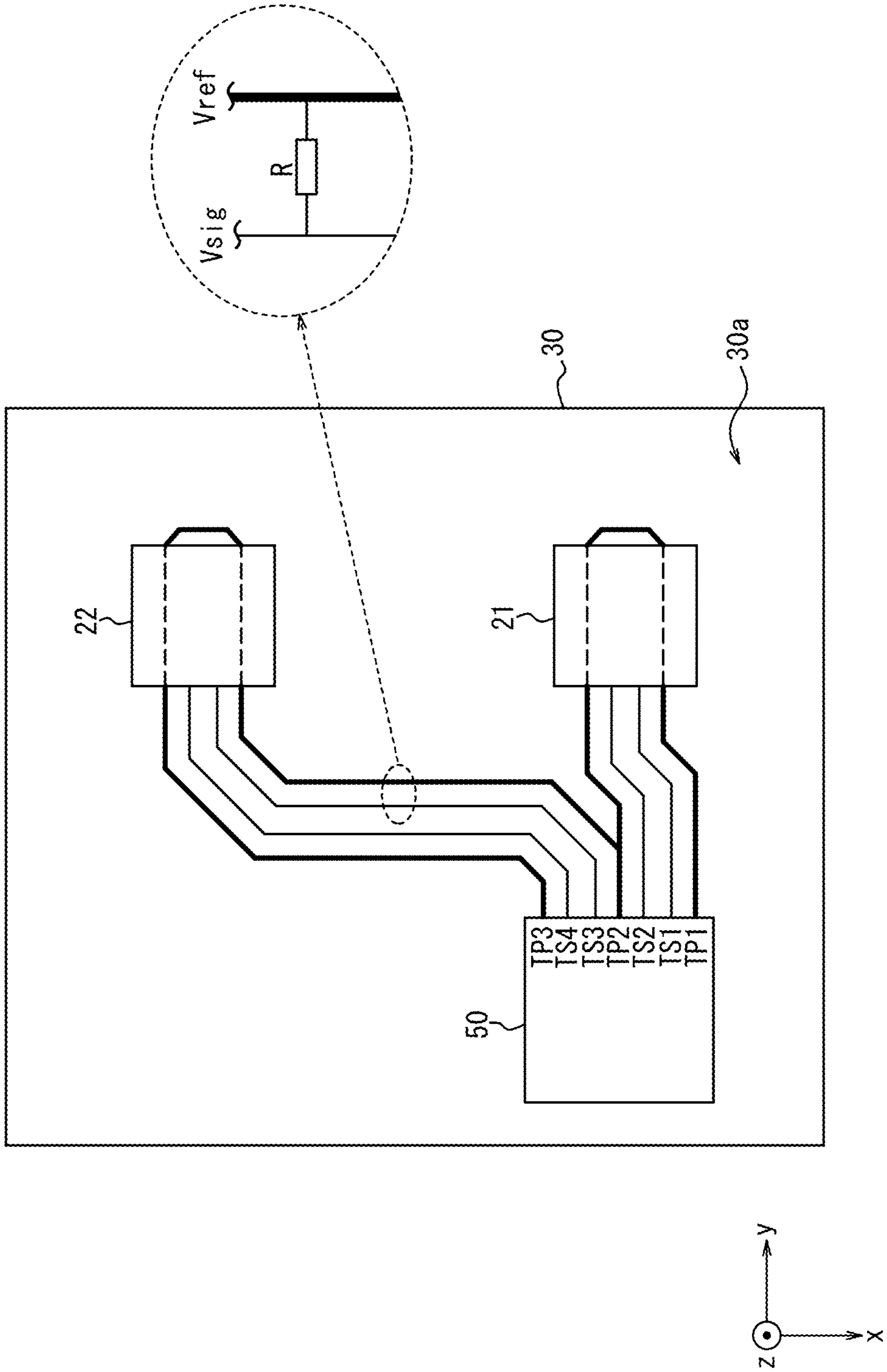
FIG. 2 is a plan view of a substrate from the front, with a portion of the gas sensor in FIG. 1 being transparent.

FIG. 2 is a plan view of the substrate 30 from the front, with a portion of the gas sensor 10 in FIG. 1 being transparent. In greater detail, FIG. 2 is a plan view of the substrate 30 having the detector 20 (first detector 21 and second detector 22) and the signal processor 50 provided thereon, with the gas cell 40, the light source substrate 12, the light source 11, and the seal 23 being transparent. The components of the gas sensor 10 are described in detail below, followed by a description of the layout of the signal processor 50 and substrate 30 illustrated in FIG. 2.

(Substrate 30)

The substrate 30 functions to hold the gas cell 40, the light source module, the first detector 21, and the signal processor 50. In the present embodiment, the substrate 30 is a printed circuit board (PCB) for mounting the light source module, the first detector 21, and the signal processor 50 and electrically connecting these components. The material of the substrate 30 is, for example, paper, glass cloth, ceramic, polyimide, or liquid crystal polymer.

(Gas Cell 40)

The gas cell 40 has the gas detection space 42 for detecting the gas to be detected, as described above. The gas detection space 42 is an interior space enclosed by the outer wall of the gas cell 40 and the substrate 30. The material of the outer wall of the gas cell 40 can, for example, be metal, glass, resin, or a composite of these materials. The resin can, for example, be phenolic resin, epoxy resin, polyimide resin, bismaleimide triazine resin, fluorine resin, polyphenylene oxide resin, liquid crystal polymer (LCP), polypropylene (PP), or polyetheretherketone (PEEK). The resin may also be polyamide (PA), polyphenylene ether (PPE), polycarbonate (PC), polyphenylene sulfide (PPS), polymethyl methacrylate resin (PMMA), or polyarylate resin (PAR). The resin may also be a hard resin or the like in which two or more of these materials are mixed. Furthermore, the gas cell 40 is preferably configured by a material with a low light absorption coefficient and high reflectance in order to efficiently confine the light emitted from the light source 11 in the gas cell 40. Specifically, the material of the gas cell 40 is preferably a resin housing coated by an alloy containing aluminum, gold, or silver, a dielectric, or a laminate of these materials. From the perspective of high productivity and light weight, the inner surface of the gas cell 40 is preferably formed by vapor deposition or plating on the resin housing. The gas cell 40 may be formed by cutting, but from the perspective of productivity, the gas cell 40 is preferably formed by injection molding or pressing. The gas cell 40 and substrate 30 may be mechanically joined by adhesive, screws, tabs, fittings, grommets, welding, solder, or the like.

Here, in a case in which the gas cell 40 is made of a conductive material such as metal, and the substrate 30 and the gas cell 40 are electrically connected by solder or the like, the gas cell 40 may be fixed to a reference potential. By being fixed to the reference potential, the gas cell 40 can function as an electromagnetic shield and enhance measurement performance for the gas to be detected. The reference potential is, for example, a ground potential.

(Light Source 11)

The light source 11 emits light that contains wavelengths absorbed by the gas to be detected. The light source 11 is also referred to as a light emitter. The light source 11 may be provided on the main surface 30*a* of the substrate 30 inside the gas detection space 42. In the present embodiment, the light is infrared light. That is, the light source 11 is configured by a light emitting element that emits infrared light. The light emitting element is preferably driven at high speed by voltage pulses or current pulses. The light emitting element may, for example, be a Light Emitting Diode (LED), a Light Amplification by Stimulated Emission of Radiation (laser), a MEMS heater, or a lamp. LEDs include, for example, resonant light-emitting diodes. Lasers include, for example, vertical-cavity surface-emitting lasers. In the present embodiment, the light source 11 is an LED that emits infrared light (infrared LED). The light source 11 is preferably a quantum infrared LED that emits infrared light using electrons or holes in a semiconductor so that the light source 11 can be driven at a high frequency.

Here, the gas sensor 10 may further include a drive source that outputs a drive signal to drive the light emitting element. In the present embodiment, the drive source is included in the signal processor 50. That is, a portion of the signal processor 50 functions as the drive source.

The light source 11 may include auxiliary members that have auxiliary optical functions such as wavelength selection, light focusing, scattering, and wavelength conversion. Specifically, the auxiliary members are wavelength selective filters, lenses, phosphors, diffraction gratings, and the like.

The light source 11 emits light from a light emitting surface 11*a*. The light emitting surface 11*a* is the surface of the light source 11 that is in contact with the light source substrate 12. The light emitting surface 11*a* corresponds to one of the faces of the light source 11 that has the largest area.

The wavelength of infrared light may be between 2 μm and 12 μm. The region of 2 μm to 12 μm is a particularly suitable wavelength range for use in the gas sensor 10, as many absorption bands specific to various gases exist in this region. For example, absorption bands exist for methane at a wavelength of 3.3 μm, carbon dioxide at a wavelength of 4.3 μm, and alcohol (ethanol) at a wavelength of 9.5 μm.

A portion of the light emitted by the light source 11 may be directed toward the gas detection space into which the gas to be detected is introduced. Other portions of the light emitted by the light source 11 need not be directed toward the gas detection space into which the gas to be detected is introduced. The light emitted by the light source 11 may directly be directed toward the gas detection space into which the gas to be detected is introduced, or the light may be directed toward the gas detection space into which the gas to be detected is introduced via a reflector (light guide) such as a mirror.

(Seal 23)

The seal 23 is formed by a mold resin, for example, but this configuration is not limiting, as long as the seal 23 seals the light source 11 and the second detector 22. In a case in which the seal 23 is formed by mold resin, the light source 11 and the second detector 22 can be integrated with the light source substrate 12 while maintaining the positional relationship between the light source 11 and the second detector 22. Epoxy resin, phenolic resin, or the like may, for example, be used as the material of the mold resin.

(Light Source Substrate 12)

The light source substrate 12 may, for example, be a semiconductor substrate. The semiconductor substrate may, for example, be a Si substrate, an InP substrate, or a GaAs substrate. The light source substrate 12 may include auxiliary members that have auxiliary optical functions such as wavelength selection, light focusing, scattering, and wavelength conversion. Specific examples of the auxiliary members are wavelength selective filters, lenses, phosphors, diffraction gratings, and the like.

(Second Detector 22)

The second detector 22 functions as a photodetector to detect the amount of light emitted from the light source 11. The second detector 22 may be configured to include a light receiving element that is sensitive to the wavelength band of the light emitted from the light source 11. As a specific example, the light receiving element may be a quantum type sensor, such as a photodiode with a PIN structure. As another example, the light receiving element may be a phototransistor, a thermopile, a pyroelectric sensor, a bolometer, or the like. In the present embodiment, the light receiving element is a quantum infrared sensor. The second detector 22 is located at the position of incidence of light, among the light emitted from the light source 11, that is reflected at the surface of the light source substrate 12 in contact with the gas detection space 42 and that passes through the interior of the light source substrate 12. By being arranged at such a position, the second detector 22 can detect the amount of light emitted from the light source 11 regardless of the usage environment.

Here, the gas sensor 10 has an analog-to-digital converter that converts the analog signal (detection signal) outputted by the second detector 22 to a digital signal. The analog signal (detection signal) outputted by the first detector 21 is also converted to a digital signal. In the present embodiment, the analog-to-digital converter is included in the signal processor 50. In other words, the signal processor 50 has the function of acquiring the detection signal outputted from the detector 20 and converting the detection signal to a digital signal.

(First Detector 21)

During concentration measurement of the gas to be detected that is present in the gas (air) in the gas detection space 42, the first detector 21 detects changes in accordance with the amount of the gas to be detected that is present. The first detector 21 is provided on the main surface 30*a* of the substrate 30 inside the gas detection space 42. In the present embodiment, the first detector 21 may be configured to include a light receiving element that is sensitive to the wavelength band of the light emitted from the light source 11. As a specific example, the light receiving element may be a quantum type sensor, such as a photodiode with a PIN structure. As another example, the light receiving element may be a phototransistor, a thermopile, a pyroelectric sensor, a bolometer, or the like. In the present embodiment, the light receiving element is a quantum infrared sensor. The first detector 21 is located at the position of incidence of light, among the light emitted from the light source 11, that passes through the gas detection space 42. Here, the gas detection space 42 may be provided with a reflective portion (light guiding portion) that reflects light so that the light emitted from the light source 11 is reflected to be incident on the first detector 21. The reflective portion may, for example, be a concave mirror, the reflective surface of which may be formed by a metal having a high reflectance, such as aluminum or gold.

The first detector 21 may receive light, among the light emitted from the light source 11, that has passed through the gas detection space into which the gas to be detected is introduced. Among the light emitted from the light source 11, the first detector 21 may receive both light that has passed through the gas detection space into which the gas to be detected is introduced and light that has not passed through the gas detection space into which the gas to be detected is introduced.

As another example, in a case in which the gas sensor 10 is photoacoustic, the first detector 21 can, for example, be a microphone, a barometric pressure sensor, or a pressure sensor.

(Gas Detection Space 42)

The gas detection space 42 has a space separated by outer walls and functions to contain gases such as air in this interior space. The gas contained in the gas detection space 42 is replaced through the hole 43.

(Hole 43)

The hole 43 is provided in a portion of the outer walls (side walls and ceiling) that define the gas detection space 42 of the gas cell 40. Gas passes through the hole 43 and replaces the gas inside the gas detection space 42. More than one hole 43 may be provided. Here, the hole 43 may be provided with a dust filter to prevent dust. The dust filter may, for example, be a non-woven fabric, a Teflon® sheet (Teflon is a registered trademark in Japan, other countries, or both), or the like.

(Signal Processor 50)

The signal processor 50 may control the entire gas sensor 10. For example, the signal processor 50 may perform calculations to obtain the concentration of the gas to be detected. In other words, the signal processor 50 may calculate the concentration of the gas to be detected based on the detection signals from the detector 20. As described above, in the present embodiment, the signal processor 50 has at least the function of acquiring the detection signal outputted from the detector 20 and converting the detection signal to a digital signal. In the present embodiment, the signal processor 50 also functions as a drive source to drive the light emitting element. The signal processor 50 may be configured to include one or more processors. The processor may, for example, be a general-purpose processor or a dedicated processor specialized for particular processing, but the processor is not limited to these examples and may be any processor. The signal processor 50 may be a compact signal processing device configured by an IC that includes one or more processors.

(Design of Gas Sensor 10)

Here, to effectively suppress leakage current and improve the measurement accuracy of the gas to be detected, the gas sensor 10 according to the present embodiment adopts the layout of the signal processor 50 and substrate 30 as illustrated in FIG. 2.

First, the signal processor 50 has a terminal array in which a plurality of signal terminals, which are input and output terminals of signal lines (thin solid lines in FIG. 2) connected to the detector 20, is sandwiched between a plurality of voltage terminals that supply voltage. The voltage supplied by the plurality of voltage terminals may be a constant voltage other than 0 V. The constant voltage here includes cases in which the voltage can be considered approximately constant when taking into consideration errors such as voltage fluctuations caused by the operation of peripheral circuits, voltage fluctuations caused by device variations, voltage fluctuations caused by temperature characteristics, and the like. In the example in FIG. 2, the plurality of voltage terminals are configured by a first voltage terminal (TP1), a second voltage terminal (TP2), and a third voltage terminal (TP3). In the present embodiment, the plurality of voltage terminals is not at ground potential (not 0 V) and provides an analog reference voltage used within the analog signal processing circuit. The analog signal processing circuit amplifies the detection signal, which is an analog signal, or reduces noise. In the example in FIG. 2, the plurality of signal terminals are configured by two signal terminals (TS1, TS2) for connection with the first detector 21 and two signal terminals (TS3, TS4) for connection with the second detector 22. The two signal terminals (TS1, TS2) are sandwiched between the first voltage terminal (TP1) and the second voltage terminal (TP2). The two signal terminals (TS3, TS4) are sandwiched between the second voltage terminal (TP2) and the third voltage terminal (TP3). Here, it suffices for the number of signal terminals sandwiched between the first voltage terminal (TP1) and the second voltage terminal (TP2) to be at least two, and this number may, for example, be three or more. Similarly, it suffices for the number of signal terminals sandwiched between the second voltage terminal (TP2) and the third voltage terminal (TP3) to be at least two, and this number may, for example, be three or more.

In the gas sensor 10, in plan view, the signal processor 50 and wiring connecting the plurality of voltage terminals (thick solid line in FIG. 2) surround the signal lines (thin solid lines in FIG. 2) connecting the detector 20 and the signal processor 50. In other words, the wiring layout of the substrate 30 is designed so that the signal lines (thin solid lines in FIG. 2) are shielded by the wiring (thick solid lines in FIG. 2) of the analog reference voltage. In the example in FIG. 2, in plan view, the signal processor 50 and the wiring connecting the first voltage terminal (TP1) and the second voltage terminal (TP2) surround the signal lines connecting the first detector 21 and the signal processor 50. The signal processor 50 and the wiring connecting the second voltage terminal (TP2) and the third voltage terminal (TP3) surround the signal lines connecting the second detector 22 and the signal processor 50. Here, "surround" does not mean that the wiring connecting the plurality of voltage terminals (thick solid lines in FIG. 2) must completely enclose the signal lines (thin solid lines in FIG. 2). It suffices for "surround" to mean that the signal lines (thin solid lines in FIG. 2) are enclosed by the signal processor 50 and the wiring connecting the plurality of voltage terminals (thick solid lines in FIG. 2). A portion of the wiring that surrounds the signal lines and connects the plurality of voltage terminals may have a disconnected section. The disconnected section is a portion where the wiring is not connected (discontinuous portion). However, to effectively suppress leakage current and improve the accuracy of measurement of the gas to be detected, the length of the disconnected section is preferably 1/10 or less of the length of the signal line connecting to the detector 20 from the signal terminal. In FIG. 2, the wiring connecting the plurality of voltage terminals (thick solid lines in FIG. 2) is indicated by a dashed line at the portion where the wiring overlaps the first detector 21 or the second detector 22. The wiring in the portion indicated by the dashed line signifies that the wiring passes below (in the negative z-axis direction) the first detector 21 or the second detector 22 in plan view of the substrate 30 from the front. As another example, the wiring connecting the plurality of voltage terminals may extend in the xy-plane direction so as to pass around the first detector 21 or the second detector 22, rather than passing below (in the negative z-axis direction) the first detector 21 or the second detector 22.

Letting the voltage of the signal line connecting the detector 20 and the signal processor 50 be Vsig and the analog reference voltage be Vref, leakage current is likely to flow when the difference between Vsig and Vref is large. R in FIG. 2 represents the insulation resistance of the substrate 30. The leakage current is given by $|Vref-Vsig|/R$. R is generally on the order of gigaohms, but the interconnections of the substrate 30 are not completely insulated. Here, during operation of the gas sensor 10 (i.e., during measurement of the gas to be detected), the value of Vsig (i.e., the level of the detection signal outputted by the detector 20) is closer to Vref than to 0 V. Therefore, in the configuration of the gas sensor 10 according to the present embodiment, the leakage current during operation of the gas sensor 10 can be suppressed because the value of $|Vref-Vsig|$ is close to zero during operation of the gas sensor 10.

For example, in conventional technology, the detector 20 is surrounded by a ground potential. In such conventional technology, a leakage current given by Vsig/R is generated during operation of the gas sensor 10. Therefore, the gas sensor 10 according to the present embodiment can effectively suppress the leakage current as compared to conventional technology.

Here, in plan view of the example in FIG. 2, the signal processor 50 is rectangular in shape, and the plurality of voltage terminals and the plurality of signal terminals are all provided on one side of the signal processor 50. The signal processor 50 may, however, be configured so that a portion of the plurality of voltage terminals and the plurality of signal terminals is provided on another side. Depending on the arrangement of the plurality of voltage terminals and the plurality of signal terminals, it may be difficult to make the distance from the signal processor 50 to the first detector 21 and the distance from the signal processor 50 to the second detector 22 the same. In this case, it is preferable to arrange the first detector 21, which is directly related to the measurement of the concentration of the gas to be detected, to be closer to the signal processor 50 than the second detector 22, as illustrated in FIG. 2, for example. In other words, the wiring length from the signal processor 50 to the first detector 21 is preferably shorter than the wiring length from the signal processor 50 to the second detector 22. This is to ensure that the effect of noise on the detection signal from the first detector 21 is as small as possible.

In order to reduce the size of the gas sensor 10, a portion of the wiring connecting the first voltage terminal (TP1) and the second voltage terminal (TP2) is preferably common to a portion of the wiring connecting the second voltage terminal (TP2) and the third voltage terminal (TP3).

As described above, the optical concentration measurement device and the signal processor 50 according to the present embodiment can, with the aforementioned configuration, enhance the effect of suppression of leakage current during measurement.

Although embodiments of the present disclosure have been described through drawings and examples, it is to be noted that various changes and modifications will be apparent to those skilled in the art based on the present disclosure. Therefore, such changes and modifications are to be understood as included within the scope of the present disclosure.

A configuration with two detectors 20 has been described in the above embodiment, but there may be only one detector 20 (the first detector 21), or there may be three or more. In addition, in the case of the detector 20 having a plurality of configurations in the above embodiment, there is a common voltage terminal (i.e., TP2) across the signal terminals for connection to each detector, but a configuration with no common voltage terminal may be adopted. In other words, in the above embodiment, the signal processor 50 has a terminal array with seven terminals (TP1, TS1, TS2, TP2, TS3, TS4, TP3). Here, TP2 may be separated into two terminals (TP2A and TP2B), so that the signal processor 50 has a terminal array with eight terminals (TP1, TS1, TS2, TP2A, TP2B, TS3, TS4, TP3).

The invention claimed is:

1. An optical concentration measuring device comprising:

a light source configured to emit light toward a gas detection space into which a gas to be detected is introduced;

a detector configured to detect a signal, based on at least a portion of the light that was emitted from the light source and passed through the gas to be detected, and output a detection signal;

a signal processor configured to acquire the detection signal and convert the detection signal to a digital signal; and a substrate on which the detector and the signal processor are provided, wherein the detector comprises a first detector and a second detector, the signal processor is configured to form a terminal array in which a plurality of signal terminals is sandwiched between a plurality of voltage terminals, the signal terminals being input and output terminals of signal lines electrically connected to the detector, the voltage terminals supplying a constant voltage other than 0 V and not being electrically connected to the detector, the plurality of voltage terminals comprises a first voltage terminal, a second voltage terminal, and a third voltage terminal, and in plan view of the substrate from a front, the signal processor and a wiring connecting the first voltage terminal and the second voltage terminal surround signal lines connecting the first detector and the signal processor, and the signal processor and a wiring connecting the second voltage terminal and the third voltage terminal surround signal lines connecting the second detector and the signal processor.

2. The optical concentration measuring device according to claim 1, wherein the plurality of signal terminals comprises at least two signal terminals, for connection to the first detector, sandwiched between the first voltage terminal and the second voltage terminal, and at least two signal terminals, for connection to the second detector, sandwiched between the second voltage terminal and the third voltage terminal.

3. The optical concentration measuring device according to claim 2, wherein the plurality of signal terminals comprises two signal terminals, for connection to the first detector, sandwiched between the first voltage terminal and the second voltage terminal, and two signal terminals, for connection to the second detector, sandwiched between the second voltage terminal and the third voltage terminal.

4. The optical concentration measuring device according to claim 1, wherein in plan view of the substrate from the front, the signal processor is rectangular in shape, and the plurality of voltage terminals and the plurality of signal terminals are all provided on one side of the signal processor.

5. The optical concentration measuring device according to claim 1, wherein a portion of the wiring connecting the first voltage terminal and the second voltage terminal is common to a portion of the wiring connecting the second voltage terminal and the third voltage terminal.

6. The optical concentration measuring device according to claim 1, wherein a wiring length from the signal processor to the first detector is shorter than a wiring length from the signal processor to the second detector.

7. The optical concentration measuring device according to claim 1, wherein a portion of the wiring has a disconnected section, and a length of the disconnected section is $1/10$ or less of a length of a signal line connecting to the detector from the signal terminal.

8. A signal processor useable in the optical concentration measuring device according to claim 1.

* * * * *